May 22, 1923.  1,455,875
J. F. GRAFF
TOWING DEVICE
Filed March 31, 1921
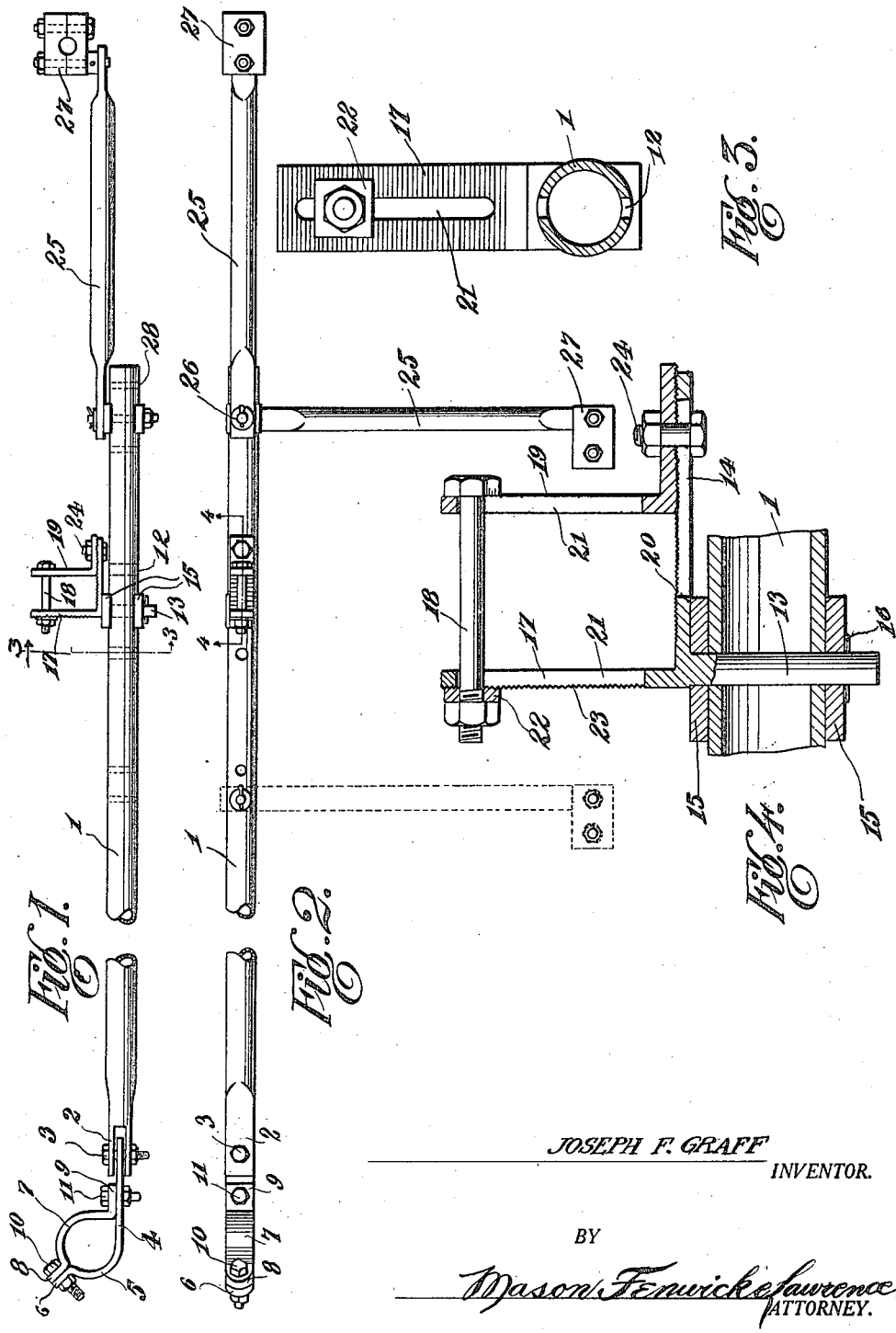
JOSEPH F. GRAFF
INVENTOR.
BY
Mason, Fenwick & Lawrence
ATTORNEY.

Patented May 22, 1923.

1,455,875

UNITED STATES PATENT OFFICE.

JOSEPH F. GRAFF, OF MILWAUKEE, WISCONSIN.

TOWING DEVICE.

Application filed March 31, 1921. Serial No. 457,394.

*To all whom it may concern:*

Be it known that I, JOSEPH F. GRAFF, a citizen of the United States, residing at Milwaukee, in the county of Milwaukee and State of Wisconsin, have invented certain new and useful Improvements in Towing Devices; and I do hereby declare the following to be a full, clear, and exact description of the invention, such as will enable others skilled in the art to which it appertains to make and use the same.

This invention relates to new and useful improvements in towing devices and more particularly to a device adapted to be used in towing disabled motor vehicles to the repair shop, the main object of the present invention is the provision of a towing device which can be quickly and readily placed in position to connect a disabled motor vehicle to a vehicle provided with suitable motive power for drawing the disabled vehicle to the repair shop and also the provision of a device whereby one or more disabled vehicles can be quickly and readily attached to a vehicle provided with suitable motive power for towing the disabled vehicles.

Another object of this invention is the provision of a device of this character which can be quickly and readily placed in position and will be securely held in a position attached to the two vehicles and prevent any displacement of the same while the disabled vehicle is being towed to a place for repairs.

A further object of the invention is the provision of a towing device whereby the several parts can be quickly and readily adjusted so that the same can be attached to various types of motor vehicles.

With the above and other objects in view the invention consists in the novel features of construction, combination and arrangement of parts hereinafter more fully set forth, pointed out in the claim and shown in the accompanying drawings in which:

Figure 1 is a side elevation of a towing device constructed in accordance with my invention;

Fig. 2 is a top plan view;

Fig. 3 is a detail section taken on the line 3—3 of Fig. 1, and

Fig. 4 is a detail section taken on the line 4—4 of Fig. 2.

In the construction of my improved towing device, I provide a tubular body member 1 having one end bifurcated to form two spaced perforated ears 2 in which is mounted a pivot bolt 3. Mounted upon the pivot bolt 3 and disposed between the ears 2 is a plate 4, the outer end of which is curved to form a seat 5 and the outer end of the plate is extended on a diagonal to form a perforated ear 6.

In order to provide a complete clamping member at one end of the body 1, an arcuate clip 7 is provided, having perforated ears 8 and 9 formed on each end thereof, the ear 8 being seated upon the ear 6 and secured in position by means of the bolt 10. The ear 9 on the clamping member 7 is abutted against the plate 4 and secured thereto by means of a bolt 11. From this it will be apparent that the arcuate end of the plate 4 can be engaged with the rear axle housing of a motor vehicle and clamped in position thereon by placing the clamping member 7 over the opposite side of the axle housing and secured to the plate 4 by means of the bolts 10 and 11.

The body member 1 is provided adjacent its other end with a plurality of openings 12 adapted to receive a stud 13 formed upon the plate 14, said stud being located preferably at one end of the plate 14 and adapted to extend through the bearing plates 15 disposed upon opposite sides of the body 1 and secured within one of the openings 12 by means of a transverse pin 16 which is extended through the lower end of the stud after being passed through the plates 15 and the body 1. It will be noted that when the plate 14 is in position upon the body, it will extend parallel with the body so that any pressure brought to bear upon the plate will be sustained by the body member 1.

The plate 14 is provided above the stud 13 with an upright portion 17, the upper end of which is perforated to receive a bolt 18, one end of said bolt being mounted in the upright portion of an angular clamping plate 19, the horizontal portion of said plate resting upon the upper face of the plate 14, thus it will be apparent that the upright portion of the plate 19, the bolt 18 and the part 17 of the plate 14 form a clamp adapted to embrace the front axle of a vehicle.

In order to prevent the device from slipping after being clamped onto the axle of the vehicle, the upper face of the plate 14 is serrated as shown at 20 and in order to attach the clamping member to various types of vehicles where the size of the axle varies, the two upright portions 17 and 19 are provided with longitudinal slots 21 in which the bolt 18 slides, and in order to securely retain the bolt in position after being attached to the vehicle axle, the washer 22 and the bolt head are provided with serrated faces adapted to co-mesh with the serrated faces 23 of the uprights 17 and 19 so as to securely hold the bolt 18 in a position to clamp the device to a vehicle axle. The horizontal portion of the clamping member 19 and the plate 14 are securely held in position by means of a transverse bolt 24 and it will be noted that the horizontal portion of the member 19 and the plate 14 are each provided with a longitudinal slot whereby the member 19 can be adjusted longitudinally of the plate 14 and securely held in place by means of the bolt 24 so that the device can be readily adapted to various sized axles.

In order to securely attach the device to the disabled vehicle, the rods 25 are pivotally connected to one end of the body member by means of the pivot bolt 26 and are each provided upon their outer ends with their clamping members 27 adapted to engage stay rods which operate the stub axle through the steering mechanism so that the front axle of the vehicle will be retained in its proper position and be guided to follow the vehicle in front without the use of a second party to steer the disabled vehicle.

It will be noted that the end of the body 1 opposite the clamping member 7 is provided with a plurality of openings 28 whereby the rods 25 can be readily adjusted to increase or decrease the distance between the clamping members 27 and the clamping plates 17 and 19 so that the rods can be arranged to fit vehicles of various types.

From the above it will be apparent that I have provided a simple and durable towing device which can be manufactured at a comparatively low cost and wherein a disabled vehicle can be quickly and readily attached to a vehicle provided with suitable motive power for conveying the disabled vehicle to a repair shop, and it will be apparent that the device can be used to tow as many disabled vehicles as the motive power of the towing vehicle will permit by using one of the towing devices between each vehicle.

I claim:

A towing device including a body bar with a transverse opening, bearing plates disposed at opposite sides of said bar, and being provided with centrally disposed openings in alignment with said transverse opening, an angle plate, a pivot stud formed on said angle plate adapted to extend through the openings in said bearing plates and body bar, the horizontal and vertical portions of said plate being provided with slots, a second angle plate mounted upon the horizontal portion of the first plate and having its vertical portions arranged in spaced relation with the vertical portion of the first plate and provided with a longitudinal slot, a bolt movable within the slot in the vertical portion of the plate and a second bolt carried by the horizontal portion of the second plate and movable in the slot in the horizontal portion of the first plate.

In testimony whereof I affix my signature.

JOS. F. GRAFF.